of the United States Patent Office 3,328,049
Patented June 27, 1967

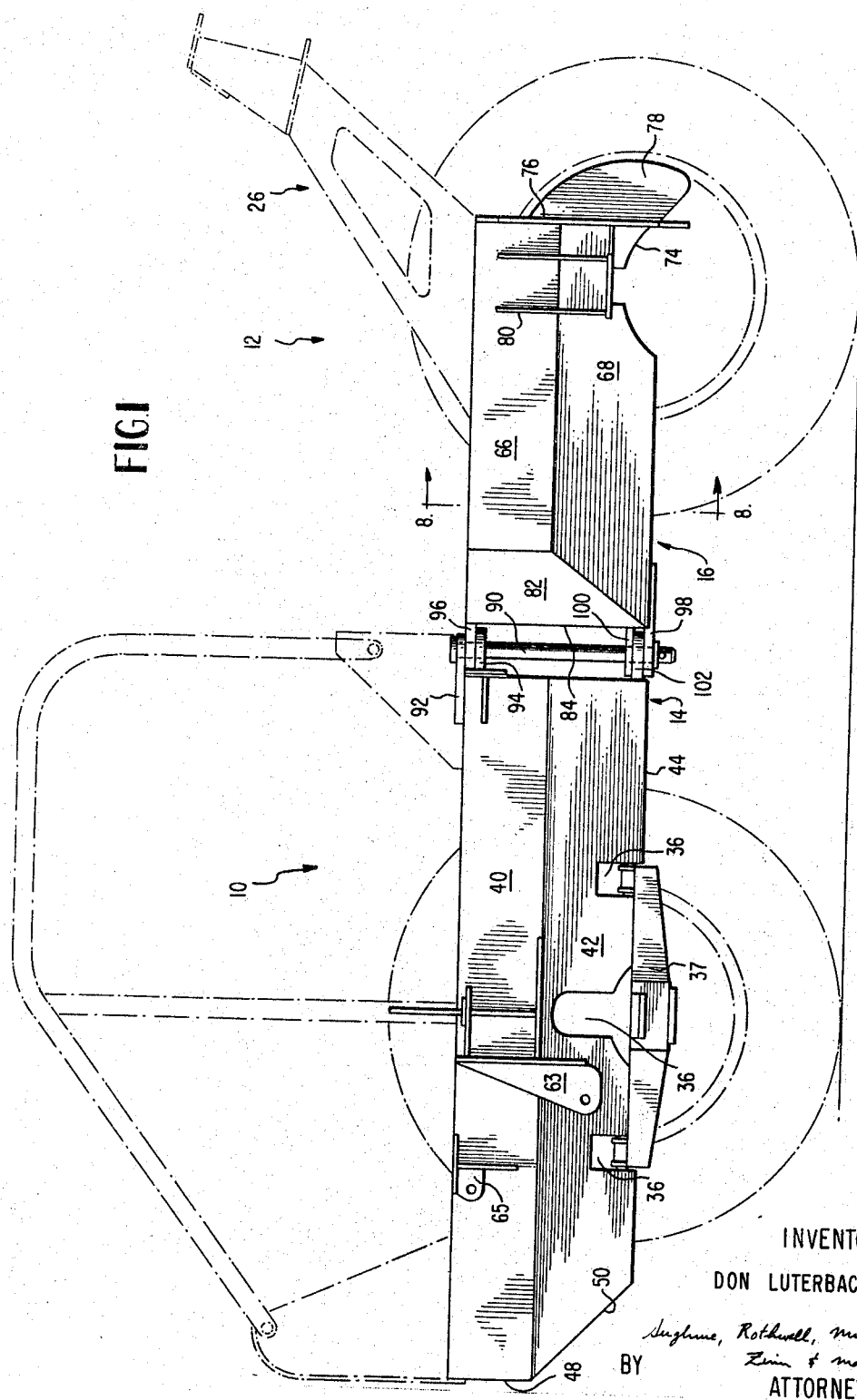

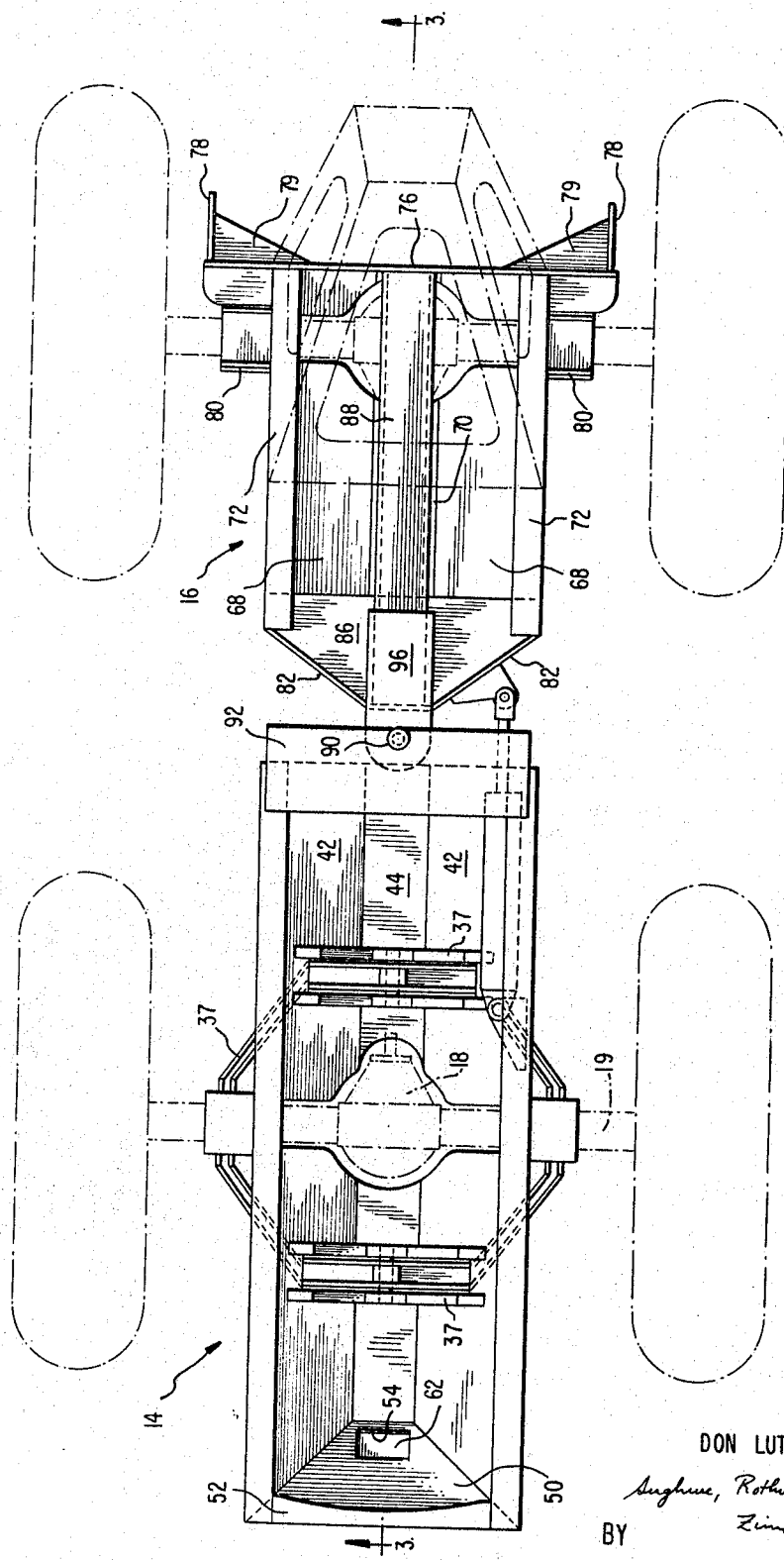

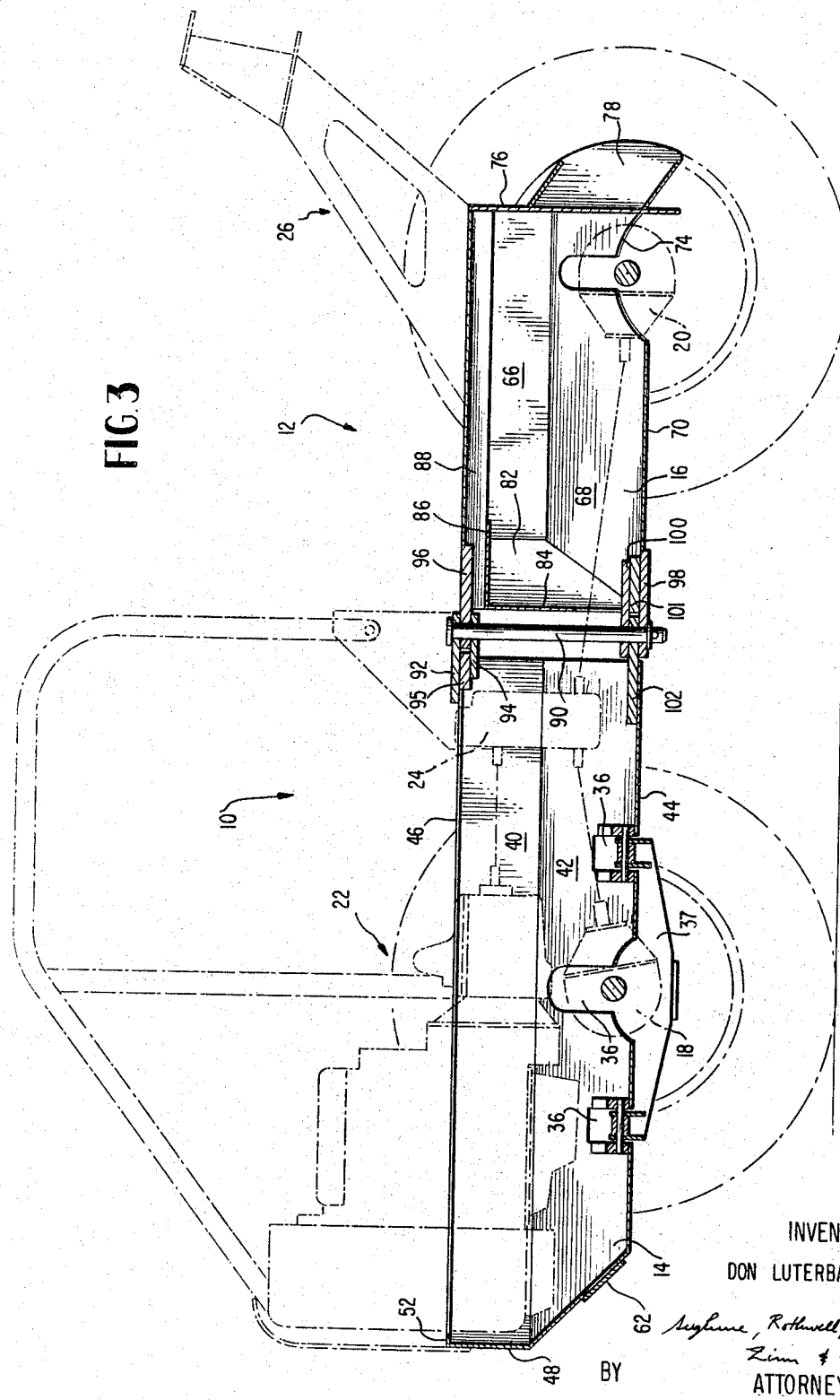

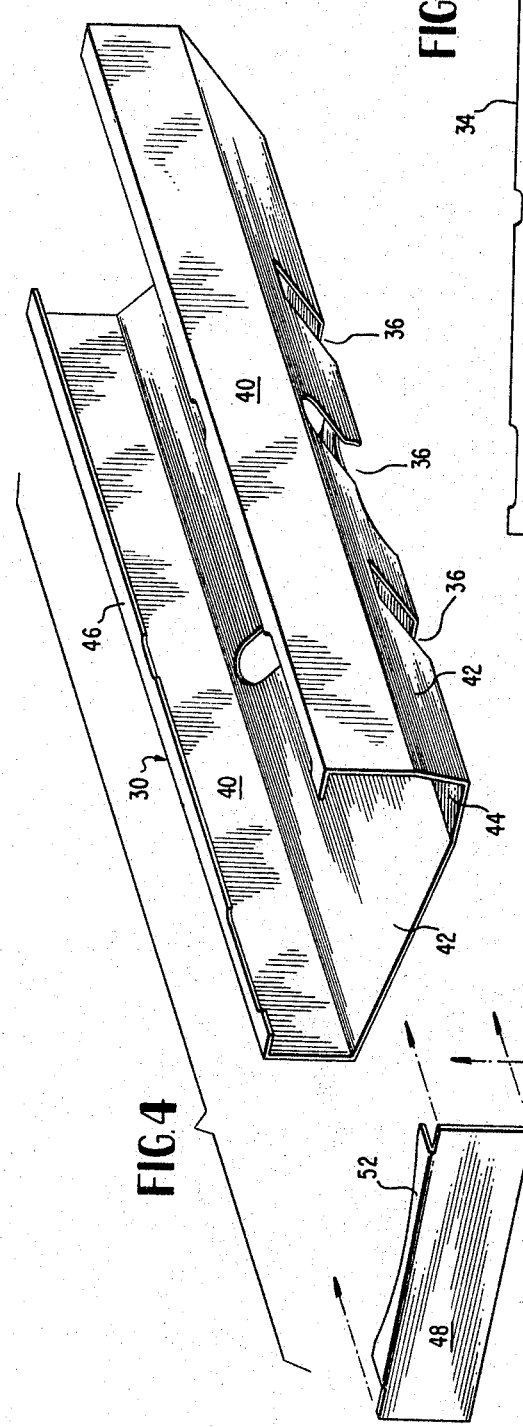
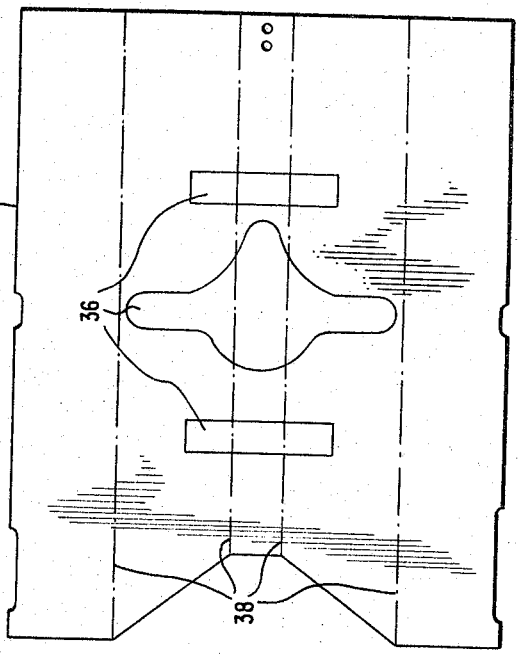
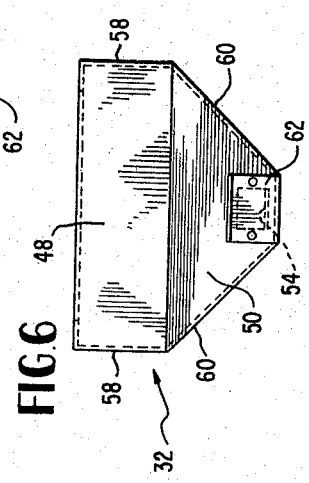

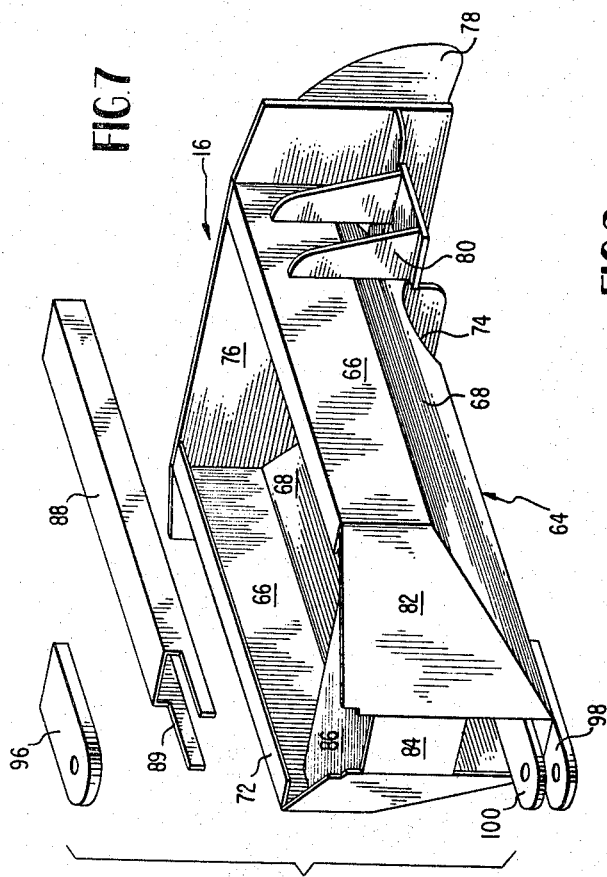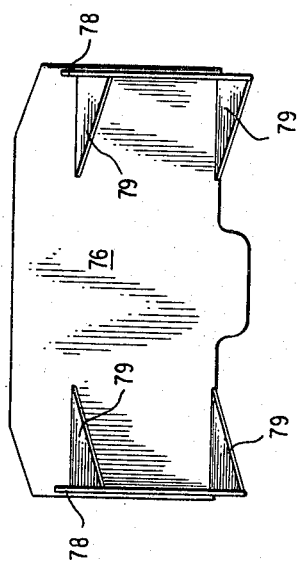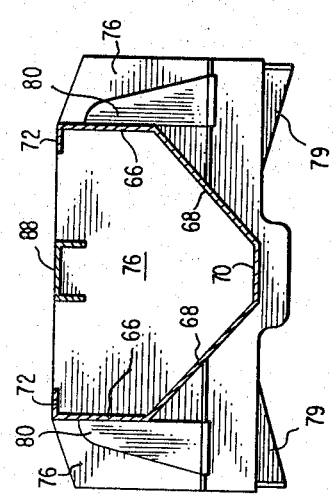

3,328,049
FRAME STRUCTURE FOR LOGGING TRACTOR
AND THE LIKE
Don Luterbach, Kalispell, Mont., assignor to Mountain
Manufacturing Co., Inc., Kalispell, Mont., a corporation of Montana
Filed Nov. 6, 1964, Ser. No. 409,516
4 Claims. (Cl. 280—106)

The present invention relates to vehicle frame structures and more particularly to frame structures for tractors and the like, such as logging tractors.

One of the problems associated with logging tractors, and with heavy duty construction vehicles in general, is that the machinery is often damaged from underneath by protruding sticks, rocks and other debris. This debris often gets into the tractor machinery and clogs or otherwise impairs its operation and damages its parts. This problem is encountered, for one specific example, when using an articulated frame logging tractor. Such a tractor includes front and rear sections which are pivotally connected to one another. Under the rugged, hard working conditions which the tractor encounters in the woods, the tractor is subject to damaging debris.

In an effort to overcome this problem, tractors have heretofore been equipped with armor plates, commonly called "bellypans," which are fastened to the underside of the tractors to protect against such damage. This construction has not proven to be entirely satisfactory, however, for several reasons. In the first place, the materials and labor required to provide this protection at the bottom of the tractors have increased the cost of the machines. Furthermore, the "bellypans" are relatively heavy and add undesirable weight to the already heavy machines.

In view of the foregoing, it is an object of the present invention to overcome the aforementioned disadvantages associated with the prior art vehicle frame structure, and to provide in their stead an improved rugged vehicle frame construction.

It is a further object of the present invention to provide a frame structure for tractors and the like which affords protection to the tractor from damaging debris, which is sturdily-built, and which is lighter and less expensive to construct than protective frame structures have been heretofore.

Other objects of the invention will be pointed out in the following description and claims and illustrated in the accompanying drawings, which disclose, by way of example, the principle of the invention and the best mode which has been contemplated of applying that principle.

FIGURE 1 is a side elevation of a logging tractor which includes a frame assembly constructed in accordance with the teachings of the present invention;

FIGURE 2 is a top view of the tractor illustrated in FIGURE 1;

FIGURE 3 is a section view of the tractor of FIGURES 1 and 2, taken along the line 3—3 of FIGURE 2;

FIGURE 4 is an exploded perspective view of the front frame member of the tractor of FIGURES 1–3;

FIGURE 5 is a top view of the flat sheet from which the main body portion of the front frame member of FIGURE 4 is formed;

FIGURE 6 is a front elevation of the front cover for the front frame member;

FIGURE 7 is an exploded perspective view of the rear frame member of the tractor illustrated in FIGURES 1–3;

FIGURE 8 is a section view of the rear frame member taken along the line 8—8 of FIGURE 1;

FIGURE 9 is a rear elevation of the rear cover plate for the rear frame section.

Referring now to the drawings, there is shown in FIGURES 1–3 a logging tractor having pivotally connected front and rear sections 10 and 12. The front section is supported and also protected at the bottom by a front frame member 14, and the rear section is protected by a rear frame member 16. As shown in FIGURE 3, the tractor is provided with front and rear differentials 18 and 20, a driving engine 22, and a transfer case 24 through which power is transmitted from the engine to the front and rear differentials. The tractor may also be equipped with a towing construction 26 for handling logs.

It is to be understood, of course, that the various equipment could be mounted on either the front or rear sections of the tractor and arranged otherwise than as shown. Furthermore, since the present invention is concerned primarily with the tractor frame construction, all parts not directly pertaining to the frame construction are shown in phantom lines for the sake of clarity.

The front frame member 14, as best shown in FIGURES 4–6 includes a main body portion 30 which may be provided with a front end cover 32. The main body portion is formed from a flat sheet of relatively rigid material 34, whose thickness will depend, of course, on the strength and rigidity required. The sheet material may be provided with suitably shaped cutouts 36 and a mounting member 37 for mounting the front differential 18 and axles 19, and may be bent along lines 38 into a configuration which is similar in shape to a bathtub. The "bathtub shape" includes longitudinally extending substantially parallel vertical side walls 40; longitudinally extending inclined side walls 42 integrally attached to the bottom edges of the vertical side walls and extending downwardly and inwardly therefrom; a longitudinally extending, horizontal bottom panel 44 integrally attached between the bottom edges of the inclined side walls; and horizontal flanges 46 integrally attached to and extending inwardly from the upper edges of the vertical side walls.

The main body may be formed inexpensively by using such equipment as sheet metal brakes. Thus, there is no need for expensive manufacturing equipment such as hydraulic presses.

The front end cover 32 includes an upper plate 48 and a lower plate 50 welded or otherwise suitably secured to the lower edge of the upper plate. The upper plate 48 has a horizontally extending flange 52 integrally connected to the upper edge thereof, which flange fits between the horizontal flanges 46 of the main body portion 30. The lower plate 50 has an aperture 54 cut therein providing access to the tractor engine, front differential, etc. A plate 56 may be bolted or otherwise detachably secured over the aperture 54.

The front cover is secured over the front end of the main body portion by welding or otherwise suitably attaching the vertical side edges 58, the inclined side edges 60 and the horizontal bottom edge 62 of the cover plate to the front edges of the vertical side walls 40, the inclined side walls 42 and the horizontal bottom panel 44, respectively, of the main body portion. The front cover functions to protect the front end of the tractor from damaging debris, and also serves as the front cross member of the frame.

As thus assembled and when applied to the tractor, the front frame member adds longitudinal, transverse and torsional rigidity to the tractor. In addition, it will protect the underside of the tractor from damage by protruding sticks, rocks and other debris.

As shown in FIGURE 1, brackets 63, 65 may be welded or otherwise suitably secured on the sides of the front frame for carrying connecting arms and hydraulic cylinders for a dozer blade (not shown) which may be provided at the front end of the tractor.

The rear frame member 16 includes a main body portion 64 shaped similarly to the main body 30 of the front frame member 14. The main body portion is also formed from a flat sheet of relatively rigid material and includes vertical side walls 66, inclined side walls 68, a bottom horizontal panel 70 and upper horizontal flanges 72. A cutout portion 74 may be provided in the main body portion for receiving the rear differential and rear wheel axles.

A rear end cover plate 76, commonly referred to as a "bang plate" is welded or otherwise suitably secured on the rear end of the main body portion 64. Rearwardly extending shields 78 may be attached to the back of the "bang plate" and braced by members 79, FIGURE 9. The "bang plate" functions to protect the rear end of the tractor from damaging debris, and also serves as the rear cross member of the frame. The shields 78 will protect the rear wheels from "clogging" debris.

As shown best in FIGURES 7 and 8, axle supporting channels 80 may be welded or otherwise suitably secured to the sides of the rear frame member for receiving the rear wheel axles 82.

The forward end of the rear frame member has forwardly and inwardly extending front walls 82 secured thereon, and a vertical plate 84 is connected between the front edges of the front walls. An inwardly extending horizontal shelf 86 is integrally attached to the upper edge of the plate 84 for supporting the forward end 89 of a channel beam 88; see FIGURES 3 and 7.

As best illustrated in FIGURE 3, the rear end of the front frame member 14 is pivotally connected to the forward end of the rear frame member 16 by means of a king-pin 90, connecting plate 92 and connecting fingers 94, 96, 100, 102. Apertured connecting plate 92 is secured across the top of the front frame member 14 adjacent the rear end thereof, and a rearwardly extending apertured connecting finger 94 is secured to the bottom of the plate 92 via a mounting block 95. The block 95 provides a slot into which fits a forwardly extending apertured connecting finger 96.

The connecting finger 96 is attached to the rear frame member 16 via a channel beam 88. The rear end of the channel beam is welded or otherwise suitably secured to the "bang plate" 76, and the front end is supported on the horizontal shelf 86 of the vertical plate 84. As shown in FIGURE 7, the forward end of the channel beam 88 is cutout so that arms 89 seat the connecting finger 96. Forwardly extending apertured connecting fingers 98, 100 are secured to the bottom of the rear frame member via a mounting block 101. The block 101 provides a slot into which fits the apertured, rearwardly extending apertured connecting finger 102 which is secured to the bottom of the front frame member.

As is evident from the foregoing, the frame structure of the present invention will not only protect the underside of the vehicle to which it is applied, but will also add strength and rigidity to the vehicle. While the frame structure has been illustrated as applied to an articulated logging tractor, it is to be understood, of course, that the frame structure could be applied to any vehicle. Furthermore, the particular locations shown for the differential mounting receiving cutouts are not critical, and such locations could be varied as required by the vehicle design.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A frame structure for motor vehicles such as tractors and the like, adapted to provide a protective channel-like housing and support for the vehicle drive train comprising: a main body portion having substantially parallel, longitudinally extending vertical side walls having front, top and bottom edges; longitudinally extending inclined side walls having front, top and bottom edges; said inclined side walls having their top edges integrally attached to the bottom edges of the vertical side walls and extending downwardly and inwardly therefrom; and a longitudinally extending bottom panel having a front and side edges; said side edges being integrally attached to and connecting the bottom edges of said inclined side walls and further including means defining cutout portions in each of said main body portions for receiving differentials and wheel axles.

2. An improved frame construction for tractors having front and rear articulated sections adapted to provide a protective channel-like housing and support for the vehicle drive train comprising: a front frame member for the front section and a rear frame member for the rear section of the tractor; each of said front and rear frame members including a main body portion having front and rear ends; said main body portions each comprising a sheet of material formed to include substantially parallel, longitudinally extending vertical side walls; downwardly and inwardly inclined side walls integrally attached to the bottom edges of said vertical side walls, and a horizontal bottom panel integrally attached to and connecting the bottom edges of said inclined side walls; and means for pivotally connecting the rear end of said front frame member to the front end of said rear frame member wherein said means for pivotally connecting the front and rear frame members includes at least one rearwardly extending, apertured finger member attached to said front frame member adjacent the rear end thereof, and at least one forwardly extending apertured finger member attached to said rear frame member adjacent the forward end thereof.

3. A frame structure for motor vehicles such as tractors and the like, adapted to provide a protective channel-like housing and support for the vehicle drive train comprising a main body portion having substantially parallel, longitudinally extending vertical side walls having front, top and bottom edges; longitudinally extending inclined side walls having front, top and bottom edges; said inclined side walls having their top edges integrally attached to the bottom edges of the vertical side walls and extending downwardly and inwardly therefrom; a longitudinally extending bottom panel having a front and side edges; said side edges being integrally attached to and connecting the bottom edges of said inclined side walls; a front end cover plate having vertical side edges attached to the front edges of the vertical side walls of said main body portion, downwardly and inwardly inclined side edges attached to the front edges of the inclined side walls and a horizontal bottom edge attached to the front edge of the bottom panel; a connecting finger attached to said main body portion adjacent one end thereof for pivotally connecting said frame structure to another frame structure; and means defining cutout portions in the said main body portion for receiving a differential and axles.

4. An improved frame construction for tractors having front and rear articulated sections, adapted to provide a protective channel-like housing and support for the vehicle drive train comprising a front frame member for the front section and a rear frame member for the rear section of the tractor; each of said front and rear frame members including a main body portion having front and rear ends; said main body portions each comprising a sheet of material formed to include substantially parallel, longitudinally extending vertical side walls; downwardly and inwardly inclined side walls integrally attached to the bottom edges of said vertical side walls, and a horizontal bottom panel integrally attached to and connecting the bottom edges of said inclined side walls; at least one rearwardly extending, apertured finger member attached to said front frame member adjacent the rear end thereof, and at least one forwardly extending, apertured finger member attached to said rear frame member adjacent the forward end thereof for pivotally connecting the rear end of said front frame member to the front end of said rear frame member; a front cover attached to the front end of said front frame member main body portion; a rear cover plate secured on the rear end of said rear frame member main body portion; and means defining cutout portions in each of said main body portions for receiving differentials and wheel axles.

References Cited

UNITED STATES PATENTS

| 2,297,198 | 9/1942 | Borgward | 280—106 |
| 2,614,644 | 10/1952 | Gustafson. | |
| 3,002,782 | 10/1961 | Jahn | 280—106 X |
| 3,080,096 | 3/1963 | Garfizzi | 220—1.5 X |

FOREIGN PATENTS

| 1,226,451 | 2/1960 | France. |

BENJAMIN HERSH, *Primary Examiner.*

P. GOODMAN, *Examiner.*